Figure 1:
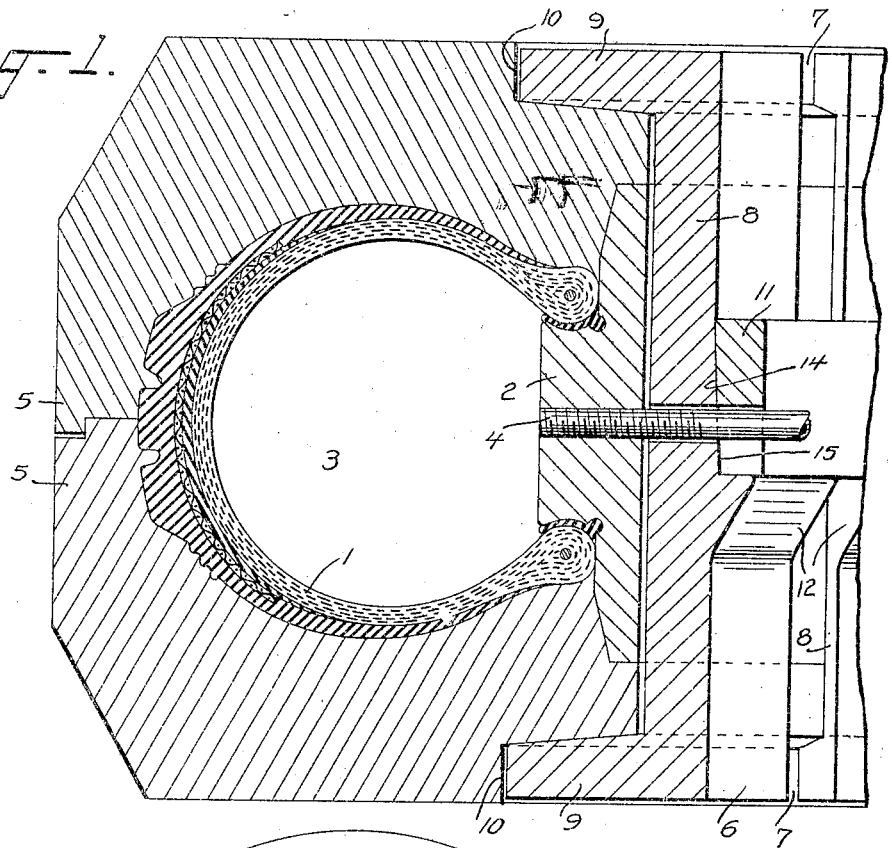

E. HOPKINSON.
MOLD FOR PNEUMATIC TIRES FOR VEHICLES.
APPLICATION FILED JAN. 31, 1918.

1,289,770.

Patented Dec. 31, 1918.

Inventor
Ernest Hopkinson

BEST AVAILABLE COPY

UNITED STATES PATENT OFFICE.

ERNEST HOPKINSON, OF NEW YORK, N. Y.

MOLD FOR PNEUMATIC TIRES FOR VEHICLES.

1,289,770.

Specification of Letters Patent. Patented Dec. 31, 1918.

Application filed January 31, 1918. Serial No. 214,610.

*To all whom it may concern:*

Be it known that I, ERNEST HOPKINSON, a citizen of the United States, residing at New York, county of New York, and State of New York, have invented certain new and useful Improvements in Molds for Pneumatic Tires for Vehicles, of which the following is a full, clear, and exact description.

This invention relates to molds for use in the manufacture of tires and is directed more particularly to the type of mold that is used in the manufacture of pneumatic tire casings.

The principal object of the invention is to devise a mold formed in sections that may be readily secured together about the tire by simple devices that may be easily and quickly applied and removed and which make it feasible to use a mold of comparatively simple design and considerably reduced in weight.

Referring to the drawings forming part of this specification:—

Figure 2:
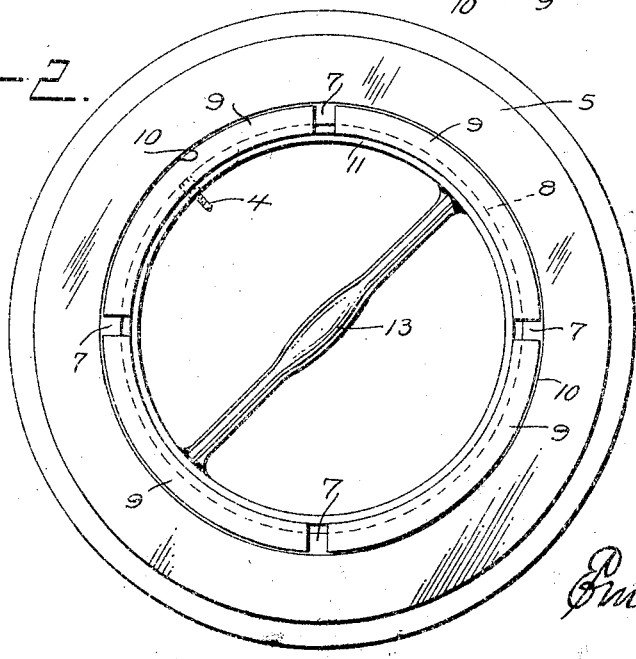

Figure 1 is a transverse sectional view of a mold showing the preferred embodiment of my invention with a tire supported therein, and Fig. 2 is a plan view of the mold shown in Fig. 1.

This invention is a modification of my invention set forth in my co-pending application Serial No. 214,609 and reference may be made thereto for a more detailed description of the subject matter common to both applications.

In the present case, the tire 1 may be supported interiorly in any desired manner, as for instance by the rim 2 and the fluid under pressure introduced into the tire cavity 3 through the tube 4, and exteriorly by the mold members 5—5. These parts are similar to those shown in my above mentioned co-pending application, but it will be understood that my invention is not limited to any particular type of interior or exterior supporting members.

The clamps 6 may be similar in all respects to the clamps described in my co-pending application, but in the present instance I have provided a locking means for the clamps which has independent engagement with each of the clamps, so that the latter may be entirely independent of each other and are, in fact, preferably arranged as shown in Fig. 1 with the intervening spaces 7. The clamps may be secured either from the inner or outer circumferences of the mold sections as may be desired, but in the present instance they are shown as positioned on the inner circumference thereof, and the webs 8 of the clamps as preferably made arc-shaped to conform to the inner circumference of the mold. The flanges 9 are preferably tapered for engaging the correspondingly tapered recesses 10 formed in the outer faces of the mold members.

In the preferred embodiment of my present invention, the clamps are held in place by means of a locking member 11 which engages each of the clamps. In the present instance, the locking means is shown in the form of a band or ring, but it is obvious that other forms may be used, it only being desired that there be no inter-dependency of the clamps in effecting the locking thereof by the said means and they may even be spaced from each other if desired, and that a single integral locking means be employed to directly engage all the clamps simultaneously to secure them against accidental displacement when the molds are being moved about or during the vulcanizing process if desired. The clamps are preferably arranged to form a circumference with a face of their webs adjacent the mold sections. The locking band or ring spans the several clamps on the opposite side of the webs and forms an abutment for each clamp to prevent its displacement by radial movement toward the ring.

In the present instance, the clamps hold the mold members from the inner circumference thereof, and one or more of the clamps are provided with lugs 12 which serve to support the ring. The ring may be conveniently provided with a handle 13 for raising and lowering it from and to locking position which preferably should be about midway of the clamps. The ring 11 is preferably made a loose fit within the circumference defined by the outer faces of the webs 8 to permit it to be easily and quickly moved to its locking position, and to insure a suitably snug engagement with the clamps when the ring has been seated upon the lugs 12, its outer surface 14 is preferably tapered to engage correspondingly tapered surfaces 15 formed on one or more of the clamps. The lugs 12 and tapered surfaces 15 coöperate to form a shoulder for supporting the ring and producing a slight binding action thereof with the clamps. The fit should not be so tight however as to prevent the ring from being easily raised when it is desired to disengage the parts.

In operation the tire supported interiorly in any desired manner, is placed within the mold members and if desired pressure is applied, for instance pressure from a hydraulic press may be employed, to force the mold members together. The clamps are then placed in position, care being taken that the lugs and tapering surfaces 15 are placed in the same order to properly receive the locking member, and lastly this member is placed in its locking position upon the lugs 14 and the clamps thereby held securely in their respective positions.

As many apparently widely different embodiments of this invention may be made without departing from the spirit thereof, it is to be understood that I do not intend to limit myself to the specific form of embodiment of the invention herein described.

Having thus described my invention what I claim and desire to protect by Letters Patent is:

1. A mold for vulcanizing tire casings comprising outer mold members, clamps holding said members together, and means independent of and separable from said members directly engaging each clamp to hold it in position.

2. A mold for vulcanizing tire casings comprising outer mold members, clamps holding said members together, and means independent of and separable from said members spanning the clamps and in engagement with each clamp to hold it in position.

3. A mold for vulcanizing tire casings comprising outer mold members, clamps arranged in a circumference for holding said members together, and means independent of and separable from said members directly engaging each clamp to hold it against radial movement.

4. A mold for vulcanizing tire casings comprising outer mold members, clamps holding said members together, and means independent of and separable from said members abutting each of said clamps to prevent movement thereof toward the said means.

5. A mold for vulcanizing tire casings comprising outer mold members, clamps holding said members together, and a band engaging the clamps to hold them in position.

6. A mold for vulcanizing tire casings comprising outer mold members, clamps holding said members together, a band engaging the clamps to hold them in position, and means for supporting the band.

7. A mold for vulcanizing tire casings comprising outer mold members, clamps holding said members together, a band engaging the clamps to hold them in position having a tapered surface engaging a correspondingly tapered surface formed on the clamps.

8. A mold for vulcanizing tire casing comprising outer mold members, clamps holding said members together, a band engaging the clamps to hold them in position, and lugs secured to the clamps for supporting the band.

9. A mold for vulcanizing tire casings comprising outer mold members, clamps arranged in a circumference for holding said members together and provided with a shoulder having a circumferential wall thereof tapering outwardly, and a band adapted to sit in said shoulder and having a tapered surface to engage the tapered surface thereof.

10. A mold for vulcanizing tire casings comprising outer mold members, clamps arranged in a circumference for holding said members together on the inner side of said mold members, and a band engaging the clamps on their inner circumference for holding them in position.

Signed at New York, N. Y., this 30th day of January, 1918.

ERNEST HOPKINSON.